United States Patent [19]

Ukai et al.

[11] Patent Number: 5,017,531

[45] Date of Patent: May 21, 1991

[54] SILICON NITRIDE CERAMIC SINTERED BODIES

[75] Inventors: Noriyuki Ukai; Issei Hayakawa, both of Nagoya; Mithuru Miyamoto, Kariya; Tadaaki Matsuhisa, Kasugai, all of Japan

[73] Assignee: NGK Insulators, Ltd., Japan

[21] Appl. No.: 469,727

[22] Filed: Jan. 24, 1990

Related U.S. Application Data

[60] Continuation of Ser. No. 295,770, Jan. 11, 1989, abandoned, which is a division of Ser. No. 129,135, Dec. 7, 1987, abandoned.

[30] Foreign Application Priority Data

| Dec. 16, 1986 | [JP] | Japan | 61-297756 |
| Jan. 8, 1987 | [JP] | Japan | 62-1132 |
| Feb. 18, 1987 | [JP] | Japan | 62-35233 |
| Mar. 31, 1987 | [JP] | Japan | 62-78228 |

[51] Int. Cl.$^5$ ............................................. C04B 35/58
[52] U.S. Cl. ........................................ 501/98; 501/97; 501/104
[58] Field of Search .......................... 501/97, 98, 104

[56] References Cited

U.S. PATENT DOCUMENTS

| 4,485,182 | 11/1984 | Enomoto et al. | 501/151 |
| 4,506,024 | 3/1985 | Claussen et al. | 501/105 |
| 4,525,464 | 6/1985 | Claussen et al. | 501/103 |
| 4,540,677 | 9/1985 | Enomoto et al. | 501/151 |
| 4,560,669 | 12/1985 | Matsuhiro et al. | 501/98 X |
| 4,628,039 | 12/1986 | Mizutani et al. | 501/98 X |
| 4,640,903 | 2/1987 | Matsuhiro et al. | 501/98 X |
| 4,659,680 | 4/1987 | Guile | 501/104 |
| 4,746,636 | 5/1988 | Yokoyama | 501/97 |
| 4,769,350 | 9/1988 | Nishioka et al. | 501/98 |
| 4,801,565 | 1/1989 | Matsui | 501/98 |

FOREIGN PATENT DOCUMENTS

| 0202899 | 11/1986 | European Pat. Off. | |
| 9026974 | 2/1984 | Japan | 501/98 |
| 61-97158 | 5/1986 | Japan | |

*Primary Examiner*—Karl Group
*Attorney, Agent, or Firm*—Parkhurst, Wendel & Rossi

[57] ABSTRACT

High density fine ceramic sintered bodies are disclosed, which have a maximum pore diameter of not more than 10 μm and a porosity of not more than 0.5%. A process for producing such high density fine ceramic sintered bodies comprises the steps of mixing a ceramic raw material powder with a sintering aid, grinding the resultant, mixture granulating and shaping the mixture, and firing the shaped body. The granulated powder is once forcedly dried, and upon necessity is added with water and/or sieved to obtain a uniform granulated powder having a given amount of water.

4 Claims, 4 Drawing Sheets

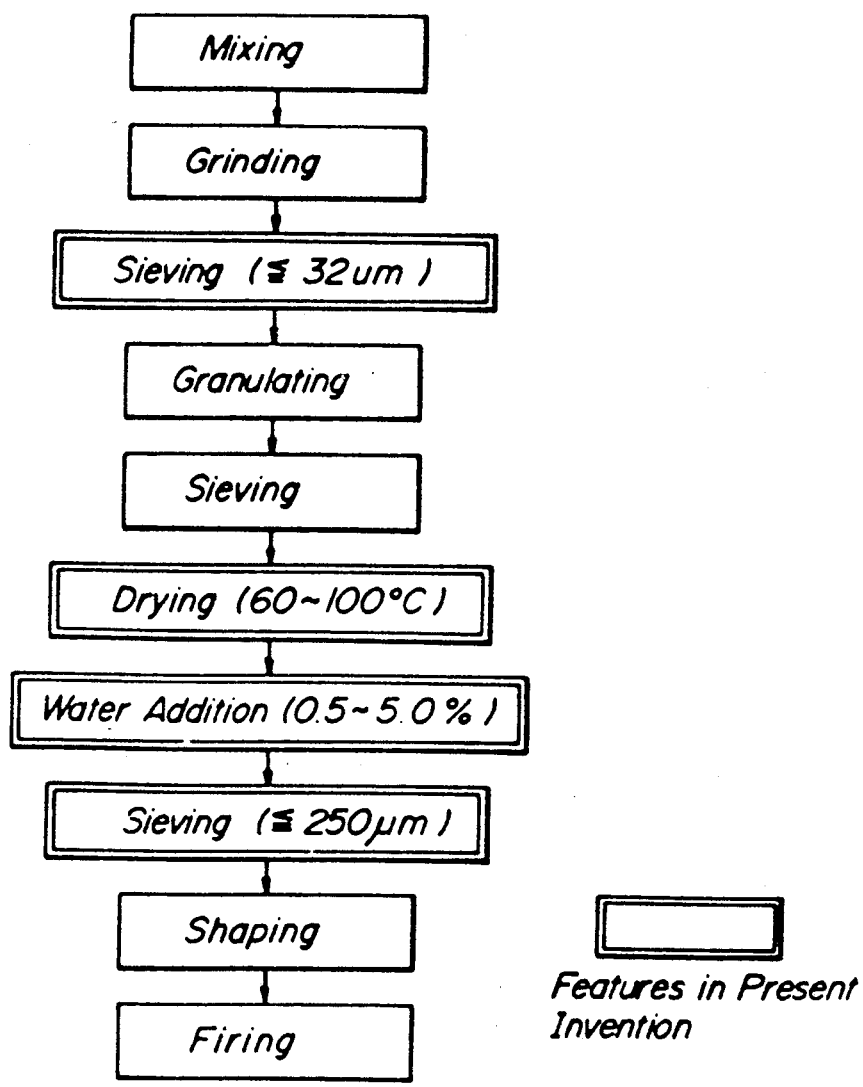

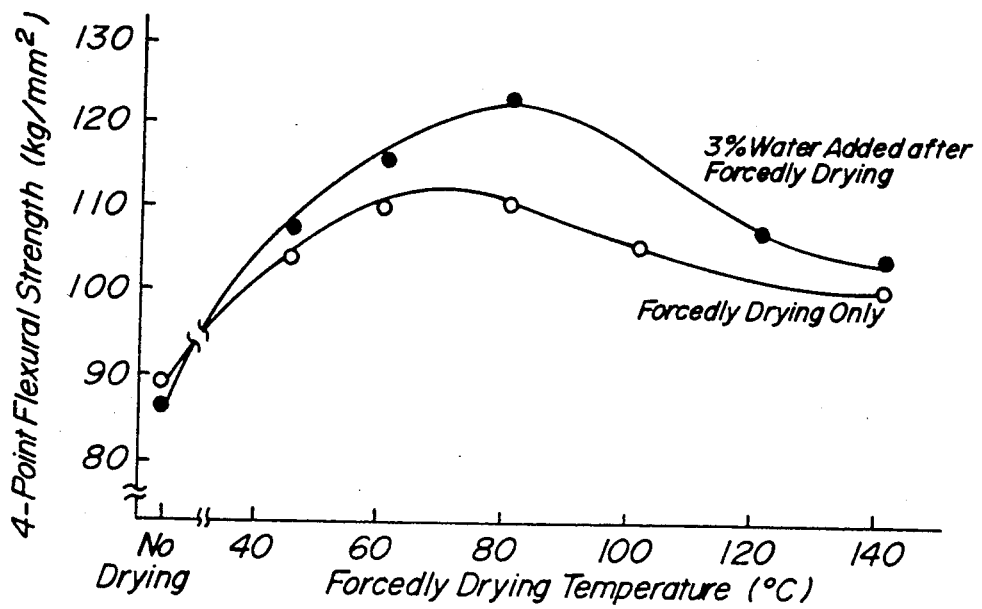
FIG.__2
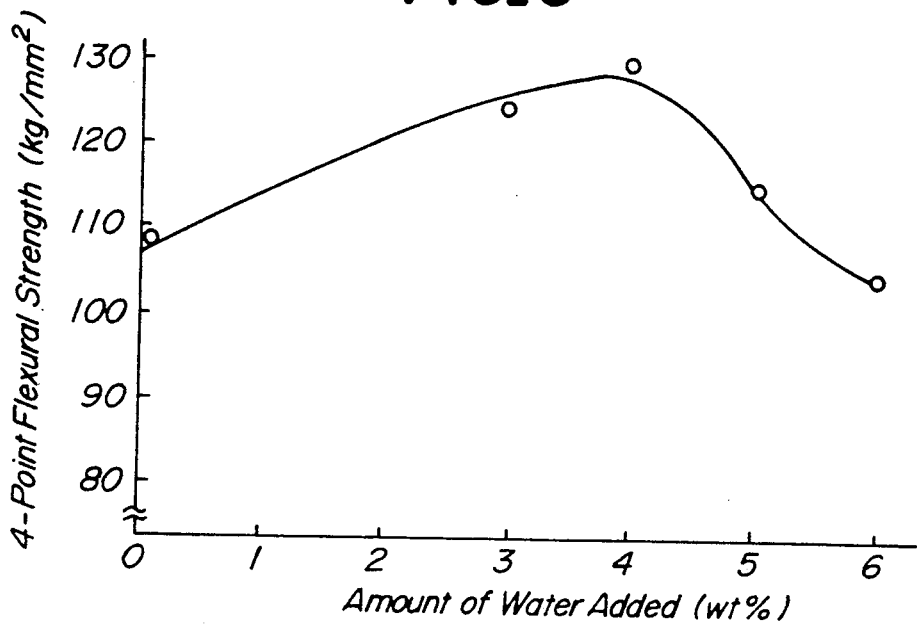
FIG.__3

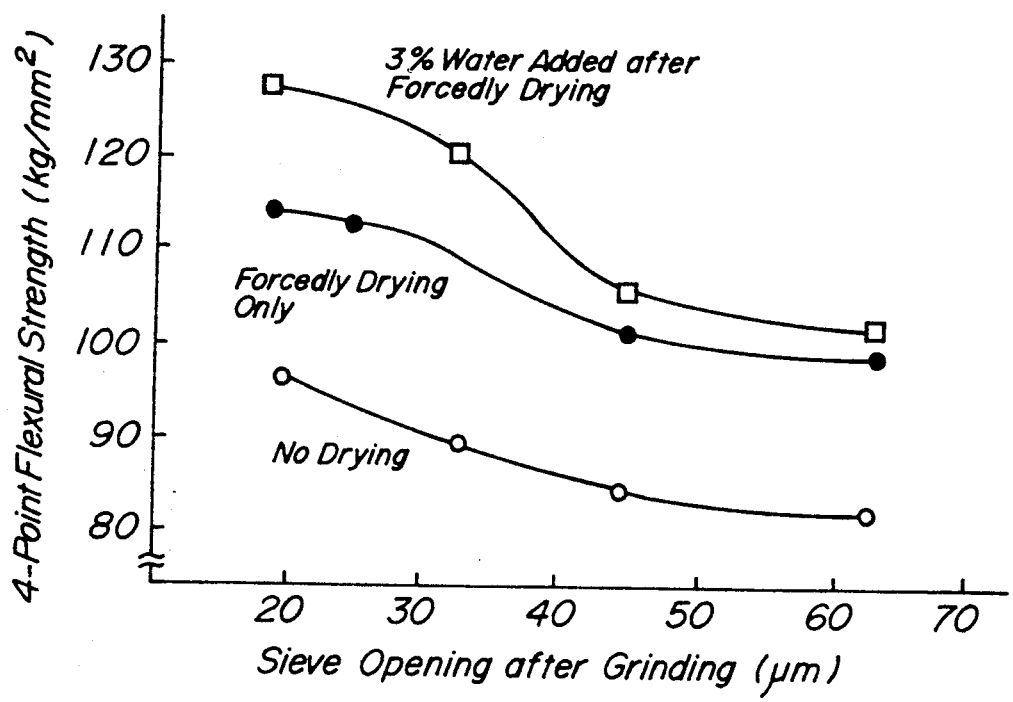
FIG_4

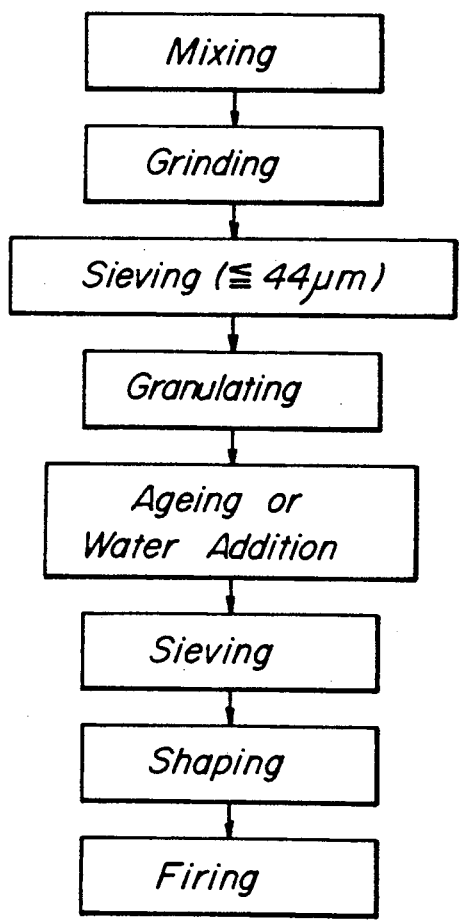
FIG_5
PRIOR ART

SILICON NITRIDE CERAMIC SINTERED BODIES

This is a continuation of application Ser. No. 07/295,770 filed Jan. 11, 1989, now abandoned, which in turn is a Division of application Ser. No. 07/129,135, filed Dec. 7, 1987.

BACKGROUND OF THE INVENTION

(1) Field of the Invention

The present invention relates to high density fine ceramic sintered bodies useful for engine parts, gas turbine parts, mechanical parts, wear resistant slide members, and the like, and a process for manufacturing the same.

(2) Related Art Statement

In order to produce ceramic products, it is a conventional practice, as shown in a flow chart of FIG. 5 by way of example, to first mix a ceramic raw material with a sintering aid, and then grind the mixture and pass through a sieve of 44 $\mu$m to remove foreign matter such as broken pieces of grinding media used for the grinding. Then, after granulating, water is added to the granulated powder as necessary, and the granulated powder is shaped by a mold press or a cold isostatic press. The shaped body is finally sintered at a given temperature to obtain a sintered product.

However, since positive measures are not taken to uniformly disperse water in the granulated powder in the above-mentioned conventional ceramic product-producing process, the amount of water in the granulated powder is locally varied. As a result, pores are formed in the shaped bodies due to nonuniform particle fracture which is caused by nonuniform water distribution in the granulated powder, so that such pores remain in the sintered products. Consequently, ceramic sintered bodies having excellent mechanical characteristics cannot be obtained.

Particularly, when ceramic sintered bodies are used as bearing members, wear resistant members or slide members, pores and hardness largely influences the use life thereof. Thus, in order to obtain ceramic products having longer use life than before, it was necessary to produce high hardness ceramic sintered products having a smaller pore diameter and porosity. Among them, when they are used as bearing materials, it is known that it is important to improve the fatigue life of the materials. Thus, there has been a demand to develop dense, high strength, and/or high hardness ceramic materials to improve rolling fatigue life.

SUMMARY OF THE INVENTION

It is an object of the present invention to obviate the above-mentioned drawbacks, and to provide dense ceramic sintered bodies having high strength and/or high hardness, as well as a process for producing the same.

The ceramic sintered bodies according to the present invention are characterized in that the maximum pore diameter is not more than 10 $\mu$m, and the porosity is not more than 0.5%. Preferably, four point flexural strength at room temperature is not less than 100 kg/mm$^2$ and/or Knoop hardness is not less than 15.5 GPa.

The process for producing the ceramic sintered bodies according to the present invention comprises the steps of mixing a ceramic raw material powder with a given sintering aid, grinding, granulating, and shaping the resulting mixture. This process is characterized in that after the granulation, uniform granulated powder having a given amount of water is obtained by forcedly drying the granulated powder and then as necessary adding water to the powder and/or sieving, the powder through a sieve.

In order to obtain silicon nitride sintered bodies, it is preferable that a silicon nitride raw material containing not less than 90% by weight of $\alpha$-silicon nitride is used and that firing is affected pressurelessly (i.e. under atmospheric pressure). More preferably, an obtained shaped body is preliminarily treated, and then treated by hot isostatic pressing (HIPing) in a nitrogen atmosphere.

In the above construction, a uniform granulated powder having no variation in water content over the granulated particles can be obtained by once forcedly drying the granulated powder, and as necessary, adding water and/or passing the granulated powder through a sieve.

That is, pores present between the particles can be reduced by attaining a uniformly press-crushed state during shaping through forcedly drying the granulated powder and adding water thereto at need. As a result, when the thus obtained granulated powder is shaped and fired, for instance, as to silicon nitride sintered bodies, high strength and high density ceramic sintered bodies having a maximum pore diameter of not more than 10 $\mu$m, porosity of not more than 0.5%, four point flexural strength of not less than 100 kg/mm$^2$ at room temperature, and Knoop hardness of not less than 15.5 GPa can be obtained even by pressureless sintering.

These and other objects, features and advantages of the present invention will be appreciated upon reading the following description of the invention when taken in conjunction with the attached drawings, with the understanding that some modifications, variations, and changes of a same could be made by the skilled person in the art to which the invention pertains without departing from the spirit of the invention or the scope of claims appended hereto.

BRIEF DESCRIPTION OF THE ATTACHED DRAWINGS

For a better understanding of the invention, reference is made to the attached drawings, wherein:

FIG. 1 is a flow chart illustrating an example of the production process according to the present invention;

FIG. 2 is a graph showing the relationship between four point flexural strength of the sintered bodies according to the present invention and the granulated powder-drying temperature;

FIG. 3 is a graph showing the relationship between four point flexural strength of the sintered bodies according to the present invention and the amount of water added to the granulated powder;

FIG. 4 is a graph showing the relationship between four point flexural strength of the sintered bodies according to the present invention and the sieve opening after grinding; and FIG. 5 is an example of a flow chart of a conventional process for the production of a silicon nitride sintered bodies.

DETAILED DESCRIPTION OF THE INVENTION

In order to obtain silicon nitride sintered bodies according to the present invention, any sintering aid may be used so long as it can make the silicon nitride dense, strong and hard. However, it is preferable to use MgO, ZrO$_2$, Y$_2$O$_3$ and/or a compound of Mg, Zr or Y which is converted to MgO, ZrO$_2$, or Y$_2$O$_3$ by heating, respectively. The reason is that MgO, ZrO$_2$, Y$_2$O$_3$ or the Mg-, Zr- or Y-compound promotes a phase transformation to elongated or rod-like β-silicon nitride crystals which are advantageous for attaining high strength and the Zr compound strengthens a intergranular phase when present in the intergranular phase during the sintering. The reason why it is preferable that the Mg compound is added in an amount of from 0.5 to 15% by weight when calculated as MgO, and that the Zr compound is added in an amount of from 0.5 to 13% by weight when calculated as ZrO$_2$, and that Y compound is added in an amount of from 2 to 15% by weight when calculated as Y$_2$O$_3$, is that if they fall outside these respective ranges, above-mentioned effects are reduced. Further, in the case of silicon nitride pressurelessly sintered bodies, it is preferable that not less than 90% by weight of silicon nitride is β-silicon nitride crystals. This is because if it is less than 90% by weight, it is difficult to attain high strength.

The forcedly drying temperature is preferably in a range of from 60° to 100° C. The reason is that if it is less than 60° C., it is difficult to attain a desired dried state, while if it is over 100° C., it is also difficult to attain a uniform press-crushed state of the granulated powder due to hardening of an auxiliary used in spray drying.

Furthermore, it is preferable that the ground raw material is passed through a sieve having a sieve opening of not more than 32 μm before granulating or the forcedly dried and water-added granulated powder is passed through a sieve having a sieve opening of not more than 250 μm. The reason is that coarse particles after grinding and foreign matters contained in the raw materials cannot effectively be removed by using a sieve having a larger sieve opening than the above, so that it is difficult to maintain uniformity of the granulated powder.

In addition, the amount of water added to the granulated powder is preferably in a range from 0.5 to 5% by weight. The reason is that if it is less than 0.5% by weight, water may not be uniformly distributed among the granulated particles to cause variation in the water content, while if it is over 5% by weight, water may ooze out from the surface of the shaped body during shaping to cause nonuniform water distribution in the shaped body.

The granulation is preferably affected by spray drying. The reason is that granulated powder of which packing density can be increased during the shaping can be obtained thereby.

Polyvinyl alcohol (PVA), polyethylene glycol (PEG), methyl cellulose (MC), and stearic acid are preferred as an auxiliary used in the spray drying. The reason is that the granulated powder is difficult to harden or break by forcedly drying it and/or adding water thereto when such as auxiliary is used.

It takes a long time to mix and grind a raw powder having an average particle size of more than 2 μm. During such a long time of mixing and grinding, there is a possibility that impurities may enter the raw material due to wearing during the grinding so that characteristics of the sintered body are deteriorated and an effect of densifying the sintered body is lost. Thus, it is preferable to use fine raw materials having the average particle size of not more than 2 μm and more preferably not more than 1 μm.

When the thus obtained shaped body is preliminarily treated and is further treated by hot isostatic pressing (HIPing) in an inert gas atmosphere, higher density, higher strength, and/or higher hardness can be attained. Such treatments are preferable because, for instance, a maximum pore diameter of not more than 10 μm and a porosity of not more than 0.3% can be attained. As an inert gas, nitrogen, argon, or the like is used.

Furthermore, it is preferable to use a silicon nitride raw material containing not less than 90%, more preferably, not less than 95% of α-silicon nitride in the production of the silicon nitride sintered bodies, because a sufficient amount of needle-like β-silicon nitride crystals which lead to high strength during sintering are precipitated owing to the α→β transformation.

In a HIP sintered body as a preferred embodiment according to the present invention, steps of forcedly drying, shaping, preliminarily treating and hot isostatic press treatment are affected in this order. In this process, the preliminary treatment is broken down into two kinds: a primary sintering method in which the shaped body is primarily fired and an encapsulating method in which a shaped body is sealed in a capsule. In the primary sintering method of the preliminary treatment, the shaped body is primarily fired, preferably at 1,400° to 1,600° C. in an inert gas atmosphere at ordinary pressure. If the firing temperature is less than 1,400° C., open pores do not disappear even after firing, so that dense sintered bodies cannot be obtained even after the hot isostatic press treatment. On the other hand, if it is more than 1,600° C., a decomposition reaction proceeds during sintering, so that dense, high strength, and/or high hardness sintered bodies cannot be obtained even after the HIP treatment, either.

Meanwhile, there are two methods for the encapsulating step. That is, a shaped body is sealed in a vacuum-evacuated glass vessel preferably consisting mainly of SiO$_2$ before the HIP treatment. Alternatively, a shaped body is buried in a glass powder before the HIP, and the glass powder is melted as the temperature rises in the HIP treatment to encapsulate the shaped body. The reason why glass is preferred as an encapsulating material is that glass has better deforming ability and sealability as a capsule during the hot isostatic press treatment.

FIG. 1 shows a flow chart of an example of the production process according to the present invention. First, a ceramic raw material having an average particle size of not more than 2 μm is mixed and ground with a sintering aid. The thus obtained mixture is passed through a sieve having a sieve opening of, preferably, not more than 32 μm to remove foreign matters and coarse particles such as broken pieces of grinding media used for grinding. Any sintering aid may be used as long as it can densify and strengthen intended ceramic materials. Then, the mixture is granulated to obtain a granulated powder containing about 1% by weight. Water the granulated powder is sieved similarly in a conventional manner. The resulting granulated powder is forcedly dried, preferably, at a temperature range from 60° to 100° C. to obtain a uniform granulated powder containing water at a low variation in an amount of from 0.2 to 0.5% by weight. Next, 0.5 to 5.0% by weight of water is added to the granulated powder as necessary to obtain a granulated powder having a uniform water content, and a final granulated powder is obtained by removing coarse particles coagulated by the addition of water, with a sieve having a sieve opening of not more than 250 μm. High strength, high density and/or high hardness ceramic sintered bodies having the characteristics of the present invention are obtained by shaping the thus obtained granulated powder in an ordinary manner and firing the resulting shaped body at ordinary pressure.

In the following, examples of the present invention will be explained. These examples are merely given in illustration of the invention, but should never be interpreted to limit the scope thereof.

EXAMPLE 1

Into 100 parts by weight of a $Si_3N_4$ powder having an average particle size of 0.5 μm were added and mixed 3 parts by weight of MgO, 1 part by weight of $ZrP_2$, 4 parts by weight of $CeO_2$, and 1 part by weight of SrO as sintering aids. After 60% by weight of water was added to the thus obtained mixture together with grinding media having a diameter of 5 to 10 mm, the mixture was mixed and ground for 4 hours by a batch grinder.

Next, the mixed and ground slurry was passed through a JIS standard sieve with a sieve opening of 32 μm, which was added and mixed with 2% by weight of PVA and 0.2% by weight of stearic acid used as auxiliaries in spray drying. Thereafter, a granulated powder having an average particle size of 80 μm and a water content of from 0.5 to 1.0% by weight was obtained by spray-drying.

Further, the granulated powder was forcedly dried at a drying temperature shown in Table 1 for 24 hours by using a thermostatic drier, and water was added thereto as necessary. When water was added, the powder was passed through a JIS standard sieve having a sieve opening shown in Table 1, thus obtaining granulated powders (Sample Nos. 1 to 8). The granulated powder was shaped at a pressure of 3 ton/cm² by cold isostatic press, thereby obtaining a shaped body of 60mm×60mm×6mm.

Then, after the shaped body was dewaxed at a temperature of 500° C. for 3 hours, it was pressurelessly sintered at a temperature of 1,700° C. for 1 hour in a nitrogen gas atmosphere, thus obtaining high strength silicon nitride sintered bodies according to the present invention (Samples Nos. 1 to 8). Apart from the above, granulated powders in Sample Nos. 9-11 were prepared as a Comparative Example of the present invention under production conditions shown in Table 1 with no forcedly drying, and were shaped and fired under similar conditions, thereby obtaining sintered bodies.

Then, with respect to the thus obtained sintered bodies, flexural strength, maximum pore diameter, and porosity were measured. Measurement results are shown in Table 1. The flexural strength was measured according to a four point flexural strength test method of fine ceramic flexural strength-testing in JIS R-1601. The maximum pore diameter and the porosity were measured with respect to a mirror-polished surface of the sintered body by means of an optical microscope at 400×magnification. The maximum width of pore was taken as the diameter of the pore, while the maximum diameter of 1,000 pores measured was taken as the maximum pore diameter. With respect to the porosity, the total pore area was determined by actually measuring areas of the above 1,000 pores in the above measurement, and the porosity was determined as a value obtained by dividing the total pore area by a total area as viewed in the measurement.

TABLE 1

| | | Producing conditions | | | Measurement results | | |
|---|---|---|---|---|---|---|---|
| Sample No. | | Forcedly drying temperature (°C.) | Amount of water added (wt %) | Sieve opening after water added (μm) | Flexural strength (kg/mm²) | Maximum pore diameter (μm) | Porosity (%) |
| Present | 1 | 45 | — | — | 91 | 10 | 0.5 |
| inven- | 2 | 45 | 3 | 325 | 95 | 7 | 0.3 |
| tion | 3 | 60 | 0.5 | 250 | 99 | 7 | 0.2 |
| | 4 | 80 | 3 | 149 | 113 | 6 | 0.2 |
| | 5 | 80 | 5 | 250 | 104 | 7 | 0.2 |
| | 6 | 100 | — | — | 95 | 8 | 0.4 |
| | 7 | 120 | 3 | 149 | 97 | 7 | 0.4 |
| | 8 | 140 | 6 | 325 | 92 | 9 | 0.3 |
| Compar- | 9 | — | — | — | 81 | 23 | 2.7 |
| ative | 10 | — | 5 | 325 | 85 | 18 | 0.8 |
| example | 11 | — | 3 | — | 79 | 32 | 3.6 |

As compared with the Comparative Examples, it is clear from Table 1 that the sintered bodies, according to the present invention, using a mixed raw material having been forcedly dried, added with water and sieved at need, are less porous, superior sintered bodies having much higher strength.

EXAMPLE 2

Into a pot made of zirconia were placed 100 parts by weight of $ZrO_2$ powder having an average particle size of 1.8 μm, 5 parts by weight of a stabilizer $Y_2O_3$, 2 parts by weight of a sintering aid $Al_2O_3$, and 100 parts by weight of water, which were mixed and ground. As shown in Table 2, the grinding was affected for 1 hour, 10 hours, or 30 hours. Then, 1% by weight of an auxiliary PEG to be used in spray drying was added to the thus mixed and ground slurry, which was spray dried to prepare a granulated powder. The thus obtained granulated powder was sampled, and was forcedly dried at a temperature shown in Table 2 for 30 hours by using a dry air drier. After water was added at need, the granulated powder was shaped at 1.5 ton/cm² by a cold isostatic press machine to obtain a shaped body of 60×60×6mm. Thereafter, the shaped body was dried, dewaxes, and fired at 1,400° C. in air, thus obtaining sintered bodies according to the present invention (Sample Nos. 12 to 18). Sintered bodies (Sample Nos. 19 to 21) were obtained as Comparative Examples utilized the same process except that no forcedly drying was affected. Further, a sintered body (Sample No. 22) was obtained as a Comparative Example by the same process except that $ZrO_2$ having the average particle size of 3 μm was used and the grinding was carried out for 48 hours without being accompanied by forcedly drying.

Then, the flexural strength of the thus obtained sintered bodies and the relative density of the shaped bodies were measured, and are shown in Table 2. The flexural strength was measured by the same method as in Example 1, and the relative densities of the shaped body wa determined as follows:

Relative density of shaped body =

$$\frac{\text{bulk specific gravity of shaped body}}{\text{true specific gravity of sintered body}} \times 100(\%)$$

As a result, it is seen from Table 2 that the invention products have higher relative density than the shaped bodies and greatly improved strength. Thus, the high strength zirconia sintered bodies were obtained by the production process according to the present invention. Comparative Example 22 having an average particle size greater than 2 μm was deteriorated in a flexural strength.

Further, the granulated powder was forcedly dried at a temperature shown in Table 3 for 24 hours by using a thermostatic drier, and water was added thereto at need. When water was added, the granulated powder was sieved with a JIS standard sieve of sieve opening shown in Table 3, thus obtaining granulated powders (Sample Nos. 31 to 38). The granulated powder was shaped at a pressure of 2.5 ton/cm$^2$ by cold isostatic press, thus obtaining a shaped body of 60mm×60mm×6 mm.

Then, after the shaped body was dewaxed at a temperature of 500° C. for 3 hours, the shaped body was pressurelessly sintered at a temperature of 1,700° C. in a nitrogen gas atmosphere for 1 hour, thus obtaining high strength silicon nitride sintered bodies according to the present invention (Sample Nos. 31 to 38). Apart from the above, granulated powders of Sample Nos. 39 to 41

TABLE 2

| Sample No. | | Grinding time (hr) | Average particle size after mixing and grinding (μm) | Forcedly drying (°C.) | Amount of water added (%) | Flexural strength (kg/mm$^2$) | Relative density of shaped body (%) | Maximum pore diameter (μm) | Porosity (%) |
|---|---|---|---|---|---|---|---|---|---|
| Present | 12 | 1 | 1.5 | 60 | 3 | 85 | 55 | 9 | 0.4 |
| inven- | 13 | 1 | 1.5 | 100 | — | 81 | 54 | 9 | 0.3 |
| tion | 14 | 1 | 1.5 | 120 | — | 79 | 53 | 10 | 0.4 |
| | 15 | 10 | 0.7 | 60 | — | 90 | 55 | 8 | 0.4 |
| | 16 | 10 | 0.7 | 80 | 3 | 97 | 56 | 5 | 0.2 |
| | 17 | 30 | 0.4 | 60 | 2 | 95 | 55 | 7 | 0.3 |
| | 18 | 30 | 0.4 | 100 | 4 | 93 | 55 | 7 | 0.3 |
| Compar- | 19 | 1 | 1.5 | — | — | 73 | 51 | 15 | 0.8 |
| ative | 20 | 10 | 0.7 | — | — | 80 | 51 | 11 | 0.6 |
| example | 21 | 30 | 0.4 | — | — | 76 | 48 | 12 | 0.7 |
| | 22 | 48 | 1.4 | — | — | 75 | 52 | 12 | 0.7 |

EXAMPLE 3

To α-silicon nitride powder having an average particle size of 0.5 μm were mixed powdery MgO, ZrO$_2$, and Y$_2$O$_3$ as sintering aids at rates of 4% by weight, 3% by weight, and 6% by weight, respectively. After 60% by weight of water was added to the thus obtained mixture, together with grinding media of 5 to 10 mm in diameter, the mixture was mixed and ground for 4 hours in a batch grinder.

Then, the mixed and ground slurry was passed through a JIS standard sieve with a sieve opening of 32 μm; and 2% by weight of PVA and 0.2% by weight of stearic acid were added to the slurry as a spray drying auxiliaries, which was spray dried to obtain a granulated powder having the average particle size of 80 μm and a water content of from 0.5 to 1.0% by weight.

were prepared as Comparative Examples of the present invention under the production conditions shown in Table 3 with no forcedly drying, and the granulated powders were shaped and fired under the same conditions, thereby obtaining sintered bodies.

Then, flexural strength, maximum pore diameter, and porosity of the sintered bodies and a ratio of β-silicon nitride crystals in the sintered body were measured in the same manner as in Example 1; Measurement results are shown in Table 3.

TABLE 3

| | | Producing conditions | | | Measurement results | | | |
|---|---|---|---|---|---|---|---|---|
| Sample No. | | Forcedly drying temperature (°C.) | Amount of water added (wt %) | Sieve opening after water added (μm) | Flexural strength (kg/mm$^2$) | Maximum pore diameter (μm) | Porosity (%) | Ratio of crystals of β-Si$_3$N$_4$ (%) |
| Present | 31 | 45 | — | — | 101 | 9 | 0.5 | 100 |
| inven- | 32 | 45 | 3 | 325 | 106 | 6 | 0.3 | 100 |
| tion | 33 | 60 | 0.5 | 250 | 110 | 5.5 | 0.2 | 100 |
| | 34 | 80 | 3 | 149 | 125 | 5 | 0.2 | 100 |
| | 35 | 80 | 5 | 250 | 115 | 6 | 0.2 | 100 |
| | 36 | 100 | — | — | 105 | 8 | 0.4 | 100 |
| | 37 | 120 | 3 | 149 | 108 | 6 | 0.4 | 100 |
| | 38 | 140 | 6 | 325 | 102 | 8 | 0.3 | 100 |
| Compar- | 39 | — | — | — | 90 | 22 | 2.7 | 100 |
| ative | 40 | — | 5 | 325 | 94 | 17 | 0.8 | 100 |
| example | 41 | — | 3 | — | 88 | 31 | 3.6 | 100 |

As is clear from Table 3, the sintered bodies according to the present invention using the mixed powder being forcedly dried, and added with water and sieved at need, were sintered bodies which had extremely higher strength and were less porous as compared with the Comparative Examples.

EXAMPLE 4

In order to examine the influences of the composition of sintered bodies and the sieve opening after grinding, granulated powders (Sample Nos. 42 to 55) were each obtained by forcedly drying granulated powder at a temperature of 80° C. for 24 hours in the same manner as in Example 3, adding 4% by weight of water thereto, and passing it through a sieve having a sieve opening of 149 μm. The thus obtained granulated powder was shaped and dewaxed in the same manner as in Example 3, which was pressurelessly sintered in a nitrogen gas atmosphere at an optimum selected firing temperature (1,600° to 1,800° C.) as giving a ratio of β-silicon nitride crystals being not less than 90% by weight, thereby obtaining high strength silicon nitride sintered bodies according to the present invention (Sample Nos. 42 to 55). Results are shown in Table 4.

TABLE 4

| | | | | | Producing conditions | | | | | Measurement results | | | | |
|---|---|---|---|---|---|---|---|---|---|---|---|---|---|---|
| | | | | | Sieve opening after grinding | Firing temperature | | | | | Flexural strength | Maximum pore diameter | Porosity | Ratio of crystals of β-Si₃N₄ |
| | | Mixing rate (wt %) | | | | | Composition of sintered body (wt %) | | | | | | | |
| Sample No. | Si₃N₄ | Y₂O₃ | MgO | ZrO₂ | (μm) | (°C.) | Si₃N₄ | Y₂O₃ | MgO | ZrO₂ | (kg/mm²) | (μm) | (%) | (%) |
| Present 42 | 95.0 | 4.0 | 0.5 | 0.5 | 32 | 1800 | 94.8 | 4.1 | 0.5 | 0.5 | 116 | 8.5 | 0.3 | 99 |
| invention 43 | 90.0 | 2.0 | 1.0 | 7.0 | 32 | 1750 | 89.7 | 2.0 | 1.0 | 6.8 | 119 | 7 | 0.4 | 100 |
| 44 | 89.0 | 6.0 | 4.0 | 1.0 | 25 | 1750 | 89.0 | 5.9 | 4.1 | 0.9 | 128 | 8 | 0.2 | 100 |
| 45 | 87.0 | 6.0 | 4.0 | 3.0 | 20 | 1700 | 86.8 | 5.9 | 4.0 | 3.1 | 130 | 6 | 0.2 | 100 |
| 46 | 84.0 | 7.0 | 7.0 | 2.0 | 20 | 1700 | 83.9 | 6.9 | 7.0 | 2.1 | 125 | 5.5 | 0.3 | 100 |
| 47 | 77.0 | 6.0 | 4.0 | 13.0 | 25 | 1700 | 76.8 | 5.9 | 3.8 | 12.9 | 124 | 6 | 0.3 | 97 |
| 48 | 74.0 | 15.0 | 4.0 | 7.0 | 25 | 1600 | 73.7 | 14.7 | 4.0 | 6.8 | 120 | 5 | 0.4 | 95 |
| 49 | 70.0 | 2.0 | 15.0 | 13.0 | 32 | 1700 | 70.0 | 2.0 | 14.8 | 13.0 | 121 | 6 | 0.3 | 93 |
| 50 | 75.0 | 6.0 | 16.0 | 3.0 | 32 | 1650 | 75.0 | 6.0 | 15.9 | 3.0 | 109 | 8 | 0.3 | 93 |
| 51 | 76.0 | 6.0 | 4.0 | 14.0 | 44 | 1700 | 75.8 | 6.1 | 3.8 | 13.9 | 105 | 9.5 | 0.4 | 92 |
| 52 | 78.0 | 16.0 | 4.0 | 3.0 | 44 | 1700 | 78.0 | 14.8 | 3.9 | 3.0 | 105 | 9 | 0.4 | 96 |
| 53 | 85.0 | 1.0 | 7.0 | 7.0 | 20 | 1750 | 84.9 | 1.0 | 7.0 | 6.9 | 100 | 5.5 | 0.2 | 88 |
| 54 | 89.0 | 7.0 | 4.0 | 0 | 25 | 1700 | 88.7 | 7.0 | 3.9 | 0 | 102 | 6 | 0.3 | 89 |
| 55 | 90.0 | 7.0 | 0 | 3.0 | 25 | 1700 | 89.9 | 7.1 | 0 | 3.0 | 107 | 6 | 0.2 | 85 |

As is clear from Table 4, among the sintered bodies of the invention, those in which: the granulated powder has been passed through a sieve of 32 μm or less; the mixed raw material contained from 0.5 to 15% by weight of MgO; the mixed raw material contained from 0.5 to 13% by weight of ZrO₂; the mixed raw material contained from 2 to 15% by weight Y₂O₃; or not less than 90% by weight of β-silicon nitride crystals were contained in the sintered body, are preferred.

In order to facilitate understanding of the results in the above Examples 3 and 4, FIGS. 2 and 3 show the relationship between the four point flexural strength of sintered bodies obtained according to the present invention and the forcedly drying temperature of granulated powders, and the relationship between the four point flexural strength of the sintered bodies and the amount of water added to a granulated powder, respectively, while FIG. 4 showing the relationship between the four point flexural strength of the sintered bodies and the sieve opening of the sieve used after the grinding.

EXAMPLE 5

To α-silicon nitride powder having the average particle size of 0.5 μm were mixed powdery MgO, ZrO₂, and Y₂O₃ as sintering aids at rates of 4% by weight, 2% by weight, and 7% by weight, respectively. After 60% by weight of water was added to the mixture, the mixture was mixed and ground by a batch grinder. The thus ground mixture was passed through a sieve with a sieve opening of 20 μm, thereby obtaining a slurry of the ground particles having an average particle size of 0.7 μm. Then, 2% by weight of polyvinyl alcohol (PVA) was added to the slurry, which was converted to a granulated powder by using a spray drier.

Further, the granulated powder was forcedly dried at a temperature shown in Table 5 for 24 hours by using a thermostatic drier, and water was added thereto upon necessity. When water was added, the powder was sieved by using a JIS standard sieve having a sieve opening of Table 5, thus obtaining granulated powders (Sample Nos. 61 to 69). The granulated powder was shaped at a pressure of 5 ton/cm² by cold isostatic pressing, thereby preparing a shaped body of 65 mm(φ)×50 mm(length).

Thereafter, the shaped body was dewaxed at a temperature of 500° C. for 3 hours, and pressurelessly sintered at a temperature of 1,460° C. for 6 hours in a nitrogen (N₂) atmosphere (primary sintering step). Then, the primarily sintered body was treated at a temperature of 1,700° C. under a pressure of 400 atms in an N₂ atmosphere by hot isostatic pressing (HIPing), thus obtaining sintered bodies according to the present invention (Sample Nos. 61 to 69). Apart from the above, sintered bodies (Sample Nos. 70 to 72) were prepared as Comparative Examples of the present invention under production conditions shown in Table 5 with no forcedly drying.

Properties of the thus obtained sintered bodies are shown in Table 5.

Knoop hardness was measured according to JIS Z2251 after a test sample was held under a load of 300 g for 15 seconds.

Rolling fatigue life was evaluated by cutting off a round disc of 50 mm(φ)×10 mm(thick) from the sintered sample, mirror polishing the surface of the round disc, and subjecting it to a rolling fatigue test at a hertz stress of 500 kg/mm² in a six ball type thrust bearing tester.

As is clear from Table 5, the HIP sintered bodies according to the present invention, using the mixed raw material being forcedly dried and added with water and further sieved at need, are sintered bodies which are extremely less porous and have excellent mechanical strengths, as compared with the Comparative Examples.

TABLE 5

| Sample No. | | Producing conditions | | | Measurement results | | | |
|---|---|---|---|---|---|---|---|---|
| | | Forcedly drying temperature (°C.) | Amount of water added (wt %) | Sieve opening after water added (μm) | Maximum pore diameter (μm) | Porosity (%) | Knoop hardness (GPa) | Rolling fatigue life (cycle) |
| Present invention | 61 | 40 | — | — | 8.0 | 0.25 | 15.5 | $1.5 \times 10^7$ |
| | 62 | 60 | — | — | 5.0 | 0.19 | 16.1 | $6 \times 10^7$ |
| | 63 | 60 | 0.5 | 149 | 3.5 | 0.12 | 16.7 | $40 \times 10^7$ |
| | 64 | 70 | 3 | 325 | 1.0 | 0.01 | 17.2 | $>110 \times 10^7$ |
| | 65 | 80 | 5 | 250 | 2.5 | 0.02 | 17.0 | $>80 \times 10^7$ |
| | 66 | 90 | — | — | 4.0 | 0.10 | 16.5 | $30 \times 10^7$ |
| | 67 | 100 | 3 | 325 | 4.0 | 0.09 | 16.5 | $35 \times 10^7$ |
| | 68 | 120 | 6 | 250 | 5.5 | 0.20 | 15.8 | $9 \times 10^7$ |
| | 69 | 140 | 5 | 149 | 7.0 | 0.23 | 15.7 | $3 \times 10^7$ |
| Comparative example | 70 | — | 3 | 149 | 11.5 | 0.43 | 14.5 | $0.4 \times 10^7$ |
| | 71 | — | 4 | — | 13.0 | 0.42 | 14.7 | $0.25 \times 10^7$ |
| | 72 | — | — | — | 16.0 | 0.58 | 13.8 | $0.07 \times 10^7$ |

EXAMPLE 6

In order to examine the influences of sieving after grinding and the average particle size after grinding, except that the kind and the amount of addition of sintering aids were changed as shown in Table 6 (in the same manner as in Example 5) the granulated powder was forcedly dried at 80° C. for 24 hours, 4% by weight of water was added thereto, and the powder was passed through a sieve with an opening of 149 μm, thus obtaining granulated powders (Sample Nos. 73 to 77).

After the thus obtained granulated powder was shaped and dewaxed in the same manner as in Example 5, the powder was sealed in a silica glass capsule under a vacuum. Then, the capsule was placed in a HIP apparatus, which was HIP-treated at a temperature of 1,600° C. under a pressure of 1,500 atms, thus obtaining silicon nitride sintered bodies (Sample Nos. 73 to 77). With respect to the thus obtained sintered bodies, the rolling fatigue test was affected similarly as in Example 5, and further, a wear resistance test was affected.

In the wear resistance test, a cylindrical sample of 15 mm(φ)×15 mm(length) was cut off from each of Sample Nos. 73 to 77, and abraded with a #140 diamond grind stone, which was subjected to the wear resistance test by using a ball mill. Test conditions were that an alumina vessel having an inner diameter of 120 mm(φ) was used, and rotated at 120 rpm.

A slurry liquid in which #100 silicon carbide powder and water were mixed at a weight ratio of 1:1 was filled up to a half of the vessel. Then, five of the above-prepared samples of 15 mm(φ)×15 mm(length) were placed in the slurry, and then subjected to the wear resistance test for 24 hours.

A wear amount was determined from changes in weight and dimension before and after the test. Results in the rolling fatigue test and the wear resistance test are shown in Table 6.

It is seen from Table 6 that among the invention products, those in which the ground powder had been passed through the sieve of not more than 32 μm; or the average particle size after the grinding was not more than 1 μm are preferred.

TABLE 6

| Sample No. | | Producing conditions | | | Measurement results | | | |
|---|---|---|---|---|---|---|---|---|
| | | Composition (wt %) | Sieve opening after water added (μm) | Average particle size after grinding (μm) | Maximum pore diameter (μm) | Porosity (%) | Wear amount (kg/cm²) | Rolling fatigue life (cycle) |
| Present invention | 73 | 92% Si₃N₄-2% SrO-3% MgO-3% CeO₂ | 44 | 0.7 | 9.0 | 0.30 | 0.10 | $2 \times 10^7$ |
| | 74 | 92% Si₃N₄-2% SrO-3% MgO-3% CeO₂ | 32 | 0.7 | 4.0 | 0.11 | 0.03 | $50 \times 10^7$ |
| | 75 | 92% Si₃N₄-2% SrO-3% MgO-3% CeO₂ | 17 | 0.7 | 3.0 | 0.06 | 0.01 | $70 \times 10^7$ |
| | 76 | 91% Si₃N₄-5% Y₂O₃-4% Al₂O₃ | 25 | 0.8 | 5.0 | 0.15 | 0.06 | $30 \times 10^7$ |
| | 77 | 91% Si₃N₄-5% Y₂O₃-4% Al₂O₃ | 25 | 1.4 | 7.5 | 0.25 | 0.09 | $5 \times 10^7$ |

EXAMPLE 7

To a silicon nitride raw powder having a average particle size of 0.7 μm and containing 97% by weight of α-silicon nitride were mixed powdery MgO, SrO, and CeO₂ at rates of 3.5% by weight, 1.5% by weight, and 5% by weight, respectively. After 60% by weight of water was added to the mixture, the mixture was mixed and ground by a batch grinder and then passed through a sieve having a sieve opening of 20 μm, thereby obtaining a slurry containing powder having an average particle size of 0.5 μm. Then, 2% by weight of polyvinyl alcohol (PVA) was added to the slurry, which was converted to a granulated powder by using a spray drier.

Further, the granulated powder was forcedly dried at a temperature shown in Table 7 for 24 hours by using a thermostatic drier, and upon necessity, wear was added and the mixture was sieved through a JIS standard sieve having a sieve opening shown in Table 7, thus obtaining granulated powders (Sample Nos. 81 to 88). The granulated powder was shaped at a pressure of 3 ton/cm² by cold isostatic pressing, thereby preparing a shaped body of 65 mm($\phi$)×50 mm(length).

Thereafter, the shaped body was dewaxed at a temperature of 500° C. for 3 hours, and then pressurelessly sintered at a temperature of 1,460° C. for 6 hours in a nitrogen ($N_2$) atmosphere (primary sintering step). Then, the primarily sintered body was treated by hot isostatic pressing (HIPing) at a temperature of 1,680° C. under a pressure of 400 atms in an $N_2$ atmosphere, thus obtaining sintered bodies according to the present invention (sample Nos. 81 to 88). Apart from the above, sintered bodies (Sample Nos. 89 to 91) were prepared as Comparative Examples of the present invention under production conditions shown in Table 7 with no forcedly drying.

Properties of the thus obtained sintered bodies are shown in Table 7.

Flexural strength, maximum pore diameter, and porosity of the thus obtained sintered bodies were measured in the same manner as in Example 1, and measurement results are shown in Table 7.

As is clear from Table 7, the HIP sintered bodies according to the present invention using the mixed raw material having been forcedly dried, added with water and sieved at need, are sintered bodies which are far less porous and have excellent mechanical strength, as compared with the Comparative Examples.

TABLE 7

| | | Producing conditions | | | Measurement results | |
|---|---|---|---|---|---|---|
| Sample No. | | Forcedly drying temperature (°C.) | Amount of water added (wt %) | Sieve opening after water added ($\mu$m) | Maximum pore diameter ($\mu$m) | Porosity (%) | 4-point flexural strength (kg/mm$^2$) |
| Present invention | 81 | 40 | — | — | 9.0 | 0.35 | 121 |
| | 82 | 60 | 0.5 | 149 | 4.5 | 0.17 | 125 |
| | 83 | 70 | 3 | 325 | 2.0 | 0.02 | 131 |
| | 84 | 80 | 5 | 250 | 3.5 | 0.03 | 135 |
| | 85 | 90 | — | — | 5.0 | 0.15 | 126 |
| | 86 | 100 | 3 | 325 | 4.5 | 0.05 | 140 |
| | 87 | 120 | 6 | 250 | 6.5 | 0.25 | 125 |
| | 88 | 140 | 5 | 149 | 8.0 | 0.25 | 122 |
| Comparative example | 89 | — | 3 | 149 | 12.0 | 0.44 | 96 |
| | 90 | — | 4 | — | 13.5 | 0.43 | 95 |
| | 91 | — | — | — | 16.5 | 0.60 | 92 |

EXAMPLE 8

In order to examine the influences of sieving after grinding and the average particle size after the grinding, an $\alpha$-silicon nitride raw material (containing 99.5% by weight of $\alpha$-silicon nitride) was mixed with sintering aids of which kinds and mixing ratios are shown in Table 8. After 60% by weight of water was added to the mixture, the mixture was ground and sieved at a sieve opening as shown in Table 8, thereby obtaining a slurry.

The average particle size in the slurry is shown in Table 8. Then, 1% by weight of polyvinyl alcohol and 0.5% by weight of stearic acid were added to the thus obtained slurry, which was converted to a granulated powder by using a spray drier. After the granulated powder was dried at 70° C. for 20 hours by using a drier and 4% by weight of water was added thereto, the powder was passed through a sieve with an opening of 149 $\mu$m. The resulting powder was shaped at a pressure of 6 ton/cm$^2$ by cold isostatic pressing, thereby obtaining a shaped body of 30 mm($\phi$)×60 mm(length). Then, the shaped body was dewaxed at 500° C. for 3 hours, and then sealed in a silica glass capsule under a vacuum. Next, the capsule was inserted into a HIP apparatus, and HIP-treated at a temperature of 1,700° C. under a pressure of 1,500 atms, thus obtaining silicon nitride sintered bodies (Sample Nos. 92 to 97).

As is clear from Table 8, among the invention products, those in which the powder had been passed through a sieve of a sieve opening of not more than 32 $\mu$m after the grinding; or the average particle size after grinding was not more than 1 $\mu$m are preferred.

TABLE 8

| Sample No. | Mixing rate (wt %) | | | | | Sieve opening after grinding ($\mu$m) | Average particle size after mixing and grinding ($\mu$m) | Maximum pore diameter ($\mu$m) | Porosity (%) | 4-point flexural strength (kg/mm$^2$) |
|---|---|---|---|---|---|---|---|---|---|---|
| | Si$_3$N$_4$ | Y$_2$O$_3$ | MgO | ZrO$_2$ | CeO$_2$ | | | | | |
| 92 | 91 | 5 | 3 | 1 | 0 | 44 | 0.6 | 8.0 | 0.20 | 127 |
| 93 | 91 | 5 | 3 | 1 | 0 | 25 | 0.6 | 3.5 | 0.08 | 145 |
| 94 | 91 | 5 | 3 | 1 | 0 | 17 | 0.6 | 2.5 | 0.06 | 157 |
| 95 | 88 | 5 | 5 | 0 | 2 | 32 | 0.4 | 5.0 | 0.11 | 135 |
| 96 | 88 | 5 | 5 | 0 | 2 | 32 | 0.9 | 7.5 | 0.25 | 123 |
| 97 | 88 | 5 | 5 | 0 | 2 | 32 | 1.4 | 8.0 | 0.30 | 120 |

EXAMPLE 9

To an $\alpha$-silicon nitride raw material containing 85% by weight, 92% by weight, or 95% by weight of $\alpha$-silicon nitride were added 6% by weight of Y$_2$O$_3$ and 4% by weight of Al$_2$O$_3$ as sintering aids, which were mixed, ground, and sieved by a sieve with an opening of 32 $\mu$m, thereby obtaining a slurry. Then, 1% by weight of methyl cellulose was added to the slurry, which was dried by a drier to prepare a granulated powder. The granulated powder was further dried by a thermostatic drier at 100° C. for 30 hours, and shaped at a pressure of 3 ton/cm$^2$ by cold isostatic pressing, thereby obtaining a shaped body of 30 mm (φ)×50 mm(length). Then, the shaped body was dewaxed at 450° C. for 5 hours and sealed in a silica glass capsule under a vacuum. Next, the capsule was inserted into a HIP apparatus, and HIP-treated at a temperature of 1,600°, 1,650°, or 1,700° C. under a pressure of 1,000 atms for 30 minutes, thus obtaining silicon nitride sintered bodies (Sample Nos. 98 to 104) as shown in Table 9.

TABLE 9

| Sample No. | | Content of α-silicon nitride in raw material (%) | Treating temperature in HIP (°C.) | Content of β-silicon nitride in sintered body (%) | 4-point flexural strength (kg/mm²) |
|---|---|---|---|---|---|
| Example | 98 | 95 | 1600 | 88 | 129 |
| | 99 | | 1650 | 93 | 135 |
| | 100 | | 1700 | 100 | 141 |
| | 101 | 92 | 1650 | 93 | 123 |
| | 102 | | 1700 | 100 | 127 |
| Comparative example | 103 | 85 | 1650 | 95 | 104 |
| | 104 | | 1700 | 100 | 105 |

As is clear from Table 9, it was revealed that the sintered bodies using a silicon nitride raw material containing not less than 90% by weight of α-silicon nitride have higher strength.

As is clear from the foregoing, according to the present invention, high strength, high density and/or high hardness fine ceramic sintered bodies having excellent mechanical strength with smaller maximum pore diameter and porosity can industrially be obtained at an inexpensive cost due to a synergistic effect of forcedly drying the granulated powder, and water incorporation and/or sieving at need, irrespective of the HIP treatment and the pressureless sintering. Consequently, the ceramic sintered bodies according to the present invention can be applied to, for instance, high temperature bearings, engine parts, gas turbine parts, and the like, and thus have extremely great industrial value.

What is claimed is:

1. A $Si_3N_4$ sintered ceramic body, consisting essentially of:
    MgO and/or an Mg compound in an amount of 0.5 to 15.9% by weight when calculated as MgO;
    $ZRO_2$ and/or a Zr compound in an amount of 0.5 to 13.9% by weight when calculated as $ZrO_2$;
    $Y_2O_3$ and/or a Y compound in an amount of 2 to 14.8% by weight when calculated as $Y_2O_3$; and
    the remainder being $Si_3N_4$;
    wherein said sintered body has a maximum pore diameter of not more than 10 μm, a porosity of not more than 0.5%, and a four point flexural strength at room temperature of not less than 100 kg/mm².

2. The ceramic sintered body according to claim 1, wherein said sintered ceramic body has a Knoop hardness of not less than 15.5 Gpa.

3. The $Si_3N_4$ sintered ceramic body of claim 1, said sintered body being produced by the method comprising:
    mixing $Si_3N_4$ ceramic raw material powder with the Mg, Zr and Y components;
    grinding and granulating the resultant mixture;
    forcedly drying the granulated powder;
    adding water and/or sieving the dried powder, thereby forming a uniform granulated powder having a given amount of water;
    shaping said uniform powder to form a body;
    firing said shaped body.

4. The $Si_3N_4$ sintered ceramic body of claim 1, wherein said sintered body has a rolling fatigue life of not less than $1.5 \times 10^7$ cycles at a hertz stress of 500 kg/mm² in a six ball type thrust bearing tester.

* * * * *